United States Patent
Kostadina

(10) Patent No.: US 6,873,898 B1
(45) Date of Patent: Mar. 29, 2005

(54) VEHICLE CONTROL SYSTEM UTILIZING GPS DATA

(75) Inventor: Robert D. Kostadina, Royal Oak, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 590 days.

(21) Appl. No.: 09/596,287

(22) Filed: Jun. 15, 2000

(51) Int. Cl.[7] .............................................. G08G 1/09
(52) U.S. Cl. ................... 701/91; 340/905; 340/539.28; 342/387; 455/404
(58) Field of Search ........................... 701/48, 70, 72, 701/91, 117, 211, 73, 78, 75, 79, 80; 180/197, 249; 340/438, 988, 903, 995, 990, 905, 539.28, 539.1, 601, 690, 825.03, 506, 436, 901, 795; 303/140, 139, 146, 147; 342/387, 464; 455/404

(56) References Cited

U.S. PATENT DOCUMENTS

| | | | |
|---|---|---|---|
| 4,657,310 A | 4/1987 | Klein | 303/6 C |
| 4,789,207 A | 12/1988 | Wupper | 303/113 |
| 4,829,434 A | 5/1989 | Karmel et al. | 74/866 |
| 4,844,557 A | 7/1989 | Giers | 303/111 |
| 4,883,328 A | 11/1989 | Burgdorf et al. | 303/116 |
| 5,272,636 A | 12/1993 | Buschmann et al. | 303/95 |
| 5,275,474 A * | 1/1994 | Chin et al. | 303/94 |
| 5,277,481 A | 1/1994 | Weise et al. | 303/9.62 |
| 5,282,677 A | 2/1994 | Luetteke | 303/116.2 |
| 5,312,169 A | 5/1994 | Buschmann | 303/100 |
| 5,322,356 A | 6/1994 | Kolbe et al. | 303/111 |
| 5,612,882 A * | 3/1997 | LeFebvre et al. | 701/209 |
| 5,774,069 A * | 6/1998 | Tanaka et al. | 340/903 |
| 5,832,402 A * | 11/1998 | Brachert et al. | 701/72 |
| 5,850,887 A * | 12/1998 | Nakashima et al. | 180/197 |
| 5,893,894 A | 4/1999 | Moroto et al. | 701/53 |
| 5,906,645 A | 5/1999 | Kagawa et al. | 701/23 |
| 5,929,534 A * | 7/1999 | Pickett | 307/10.1 |
| 5,984,435 A | 11/1999 | Tsukamoto et al. | 303/191 |
| 6,005,492 A | 12/1999 | Tamura et al. | 340/937 |
| 6,009,355 A * | 12/1999 | Obradovich et al. | 701/1 |
| 6,094,614 A * | 7/2000 | Hiwatashi | 701/89 |
| 6,112,074 A * | 8/2000 | Pinder | 455/404.2 |
| 6,163,747 A * | 12/2000 | Matsuno | 701/80 |
| 6,166,657 A * | 12/2000 | Mann | 340/905 |
| 6,174,262 B1 * | 1/2001 | Ohta et al. | 477/97 |
| 6,177,873 B1 * | 1/2001 | Cragun | 340/601 |
| 6,205,379 B1 * | 3/2001 | Morisawa et al. | 701/22 |
| 6,208,927 B1 * | 3/2001 | Mine et al. | 701/70 |
| 6,218,741 B1 * | 4/2001 | Braun et al. | 307/10.1 |
| 6,232,603 B1 * | 5/2001 | Nelson | 250/339.11 |
| 6,278,375 B1 * | 8/2001 | Hucker | 340/601 |
| 6,329,904 B1 * | 12/2001 | Lamb | 340/286.02 |
| 6,349,246 B1 * | 2/2002 | Smith et al. | 701/1 |
| 6,370,475 B1 * | 4/2002 | Breed et al. | 701/301 |
| 6,462,665 B1 * | 10/2002 | Tarlton et al. | 340/601 |

FOREIGN PATENT DOCUMENTS

| | | | | |
|---|---|---|---|---|
| JP | 03276310 A | * | 12/1991 | G05D/1/02 |
| JP | 10138725 A | * | 5/1998 | B60G/7/02 |
| JP | 11191743 A | * | 7/1999 | H04B/1/16 |
| JP | 11301512 A | * | 11/1999 | B62D/21/18 |
| JP | 2000059324 A | * | 2/2000 | H04H/1/00 |

* cited by examiner

Primary Examiner—Thomas G. Black
Assistant Examiner—Tuan C To

(57) ABSTRACT

A vehicle having a vehicle control system for controlling a performance characteristic of the vehicle and a controller. The controller is coupled to the vehicle control system and adapted to receive a position signal indicative of the present physical position of the vehicle. The controller employs the position signal to determine at least one characteristic pertinent to the operation of the vehicle control system and outputs a control signal. The control signal is received by the vehicle control system, causing the vehicle control system to tailor its performance in response thereto. A method for controlling a vehicle having a vehicle control system is also provided.

21 Claims, 2 Drawing Sheets

VEHICLE CONTROL SYSTEM UTILIZING GPS DATA

BACKGROUND OF THE INVENTION

1. Technical Field

The present invention generally relates to vehicle control systems and more particularly to a vehicle control system that utilizes data from global positioning satellites for enhanced performance.

2. Discussion

It is well known in the art that the performance of vehicle control systems, such as anti-lock brake systems, traction control systems and stability systems, are effected by a diverse number of factors that are difficult to monitor and/or detect. These factors include, for example, the type of road on which the vehicle is operating and the weather conditions in which the vehicle is being operated. When information such as this is known by the vehicle control system, the vehicle control system is able to tailor its response in a predetermined manner so as to improve its effectiveness.

One approach to providing vehicle control systems with environmental information entails a process of learning or recognizing characteristics that are indicative of a particular situation. This approach, however, has several drawbacks. First, these processes tend to be iterative in nature and as such, a lag time typically exists between the point at which the environmental conditions change and the point at which these systems achieve their maximum performance level.

A second drawback relates to the ability of these systems to precisely detect the environmental conditions in which they are being operated. For example, it is common for traction control systems to use wheel slip to determine the road surface type and/or the road surface condition. Wheel slip of a given magnitude may indicate that the vehicle is being operated on a snow-covered surface, causing the traction control to limit the torque that is delivered to the vehicle drive wheels in a desired manner. Operation of the vehicle on a sand-covered surface will provide wheel slip data that is generally indistinguishable from the wheel slip data that is generated for a snow-covered surface, causing the traction control system to operate as if the vehicle was operating on a snow-covered surface. This situation, however, the performance of the traction control system is substantially impaired as it is desirable in such situations to maximize wheel torque rather than minimize it.

In view of these limitations, another approach has been suggested wherein cameras are employed to directly determine various environmental conditions. While it is permissible to provide enhanced performance in some situations using this approach, several drawbacks have been noted. The first concerns the robustness of a system that employs optical equipment in a vehicular environment to monitor the environment in which the vehicle is operated. As with any use of optics, it is essential that the optics, whether it be the lens of the device or a protective device that covers the lens, remain clean so as to provide accurate and reliable data. Regardless of the placement of such devices, constant attention to the cleanliness of the optics must be paid to assure that the optical device is functioning properly.

SUMMARY OF THE INVENTION

It is a general object of the present invention to provide a vehicle control system that employs environmental information to improve its performance.

It is another object of the present invention to provide a vehicle having a vehicle control system that utilizes information on the position of the vehicle to enhance the performance of the vehicle control system.

It is a more specific object of the present invention to provide a vehicle which utilizes global positioning satellite data to enhance the performance of a vehicle control system.

It is yet another object of the present invention to provide a vehicle which utilizes a position signal and a weather signal to enhance the performance of a vehicle control system.

It is another object of the present invention to provide a method for controlling a vehicle which employs a position signal indicative of the position of the vehicle to enhance the performance of the vehicle control system.

In one preferred form, the present invention provides a vehicle having a vehicle control system for controlling a performance characteristic of the vehicle and a controller. Preferably, the vehicle control system includes an anti-lock brake system, a traction control system and a stability system. The controller is coupled to the vehicle control system and adapted to receive a position signal indicative of the present physical position of the vehicle. The controller employs the position signal to determine at least one characteristic pertinent to the operation of the vehicle control system and outputs a control signal. The control signal is received by the vehicle control system, causing the vehicle control system to tailor its performance in response thereto. A method for controlling a vehicle having a vehicle control system is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
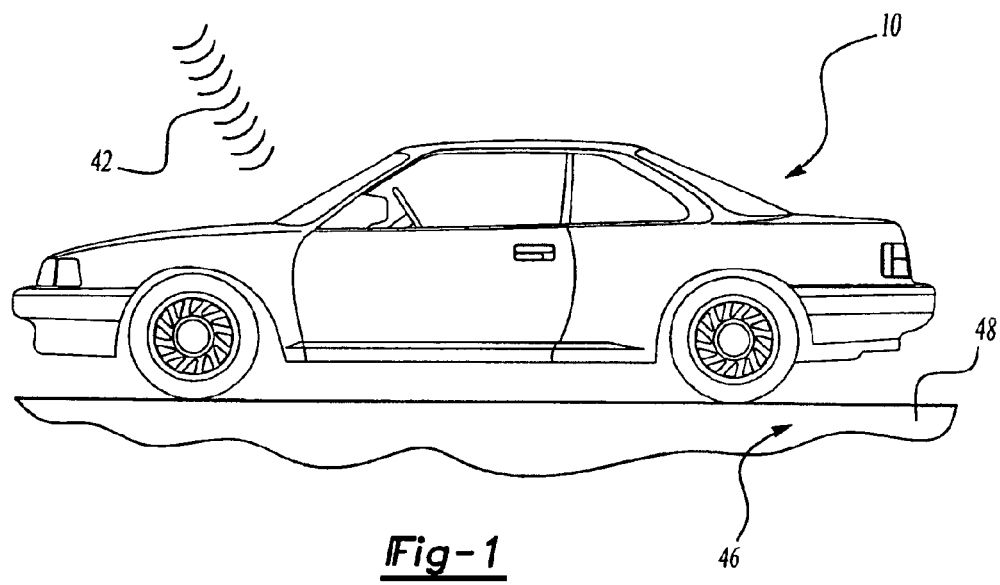
FIG. 1 is a schematic illustration of a vehicle constructed in accordance with the teachings of the present invention.
Figure 2:
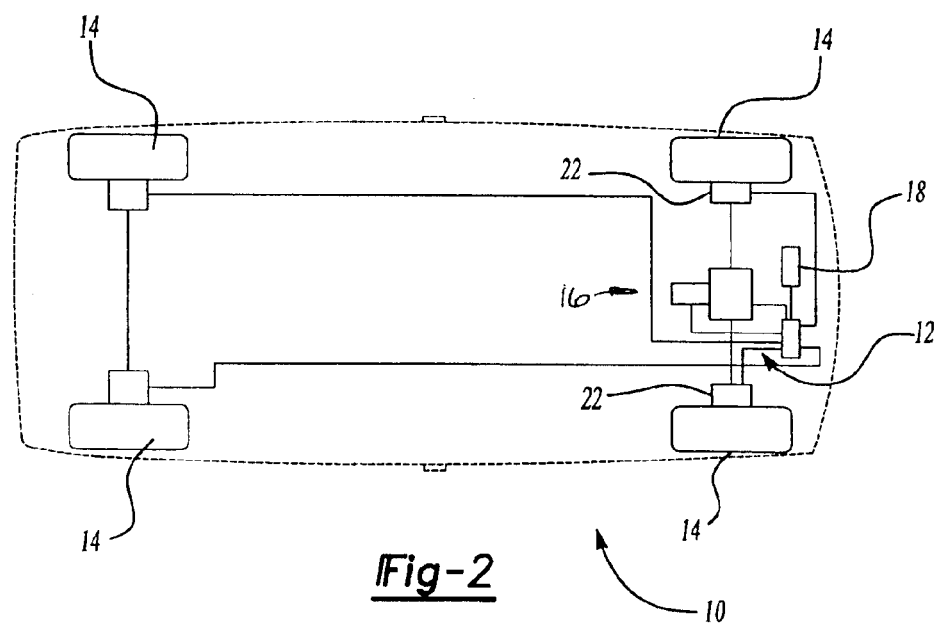
FIG. 2 is a schematic illustration of a portion of the vehicle of FIG. 1 illustrating the vehicle control system and a controller constructed in accordance with a preferred embodiment of the present invention.
Figure 3:
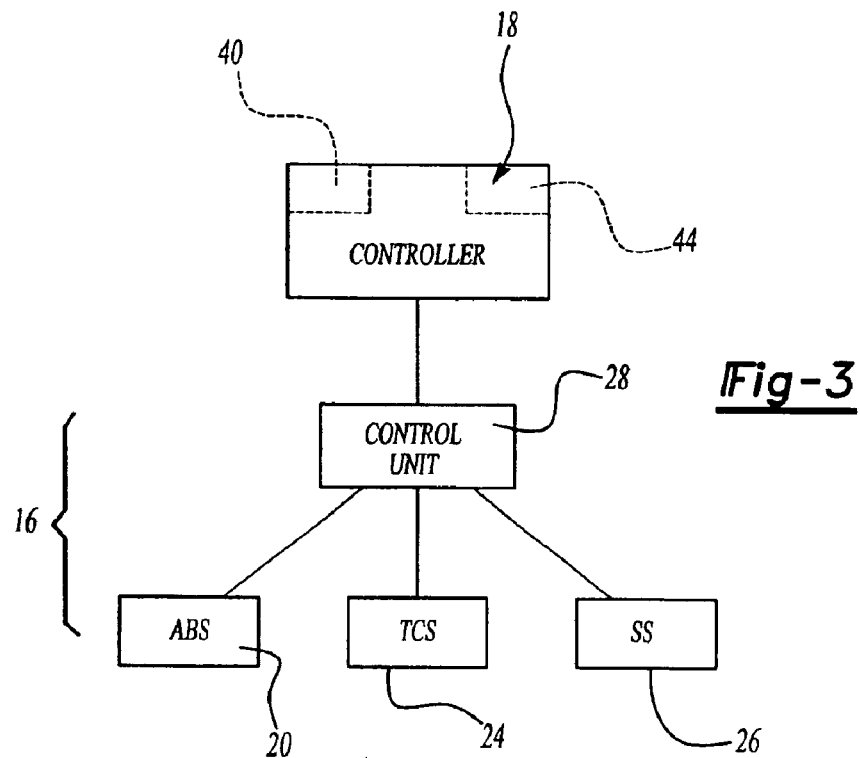
FIG. 3 is a schematic illustration of the controller and vehicle control system of FIG. 2.

With reference to FIGS. 1 through 3 of the drawings, a vehicle constructed in accordance with the teachings of the present invention is generally indicated by reference numeral 10. Vehicle 10 includes an engine and transmission assembly 12 for providing a rotational output to a plurality of vehicle wheels 14, a vehicle control system 16 for controlling a performance characteristic of the vehicle 10 and a controller 18. In the particular embodiment illustrated in FIG. 3, the vehicle control system 16 includes an anti-lock brake system 20 for controlling the braking force exerted by a caliper 22 to control skidding due to deceleration, a traction control system 24 for controlling the rotational output of the engine and transmission assembly 12 to control wheel slip due to acceleration, a stability system 26 for reducing understeer or oversteer by selectively braking one or more of the vehicle wheels 14 when the vehicle 10 is sliding, and a control unit 28 that is adapted to monitor a plurality of sensor signals and control the anti-lock brake system 20, traction control system 24 and stability system 26 in a predetermined manner. Anti-lock brake system 20, traction control system 24 and stability system 26 are discussed in greater detail in the following commonly-assigned U.S. Patents, the disclosures of which are hereby incorporated by reference as if fully set forth herein:

| U.S. Pat. No. | Title |
| --- | --- |
| 4,657,310 | Brake system for automotive vehicles with controllable brake force distribution |
| 4,789,207 | Slip-controlled brake system for automotive vehicles |
| 4,844,557 | Circuit configuration for brake systems with anti-lock control and/or traction slip control |
| 4,883,328 | Brake system with anti-locking and/or traction slip control |
| 5,272,636 | Circuit configuration for a brake system with anti-lock or traction slip control |
| 5,277,481 | Brake system for automotive vehicles with electronically controlled brake force distribution and with anti-lock control |
| 5,282,677 | Anti-lock hydraulic brake system |
| 5,312,169 | Circuit configuration for an automotive vehicle with anti-lock control and/or traction slip control |
| 5,322,356 | Method and circuit configuration to augment the driving stability of a road vehicle |

Controller 18 includes a receiver portion 40 that is operable for receiving a position signal 42, such as the signals provided by global positioning satellites (GPS), that permit controller 18 to determine the present physical location of vehicle 10 relative to a predetermined datum point. In the particular embodiment illustrated, controller 18 also includes a database portion 44 having a catalog or database of various roads 46 upon which vehicle 10 may be operated and at least one characteristic pertinent to the operation of the vehicle control system 16. Preferably, the at least one characteristic pertinent to the operation of the vehicle control system 16 includes the road surface type 48. The road surface type 48 includes data related to the material from which the road is constructed (e.g., pavement, asphalt, gravel). Those skilled in the art will readily understand that a road 46 may be broken into several segments wherein each segment may have a different road surface type 48. The at least one characteristic may also include other environmental factors which tend to affect the performance of vehicle control system 16 (e.g., crossing over an elevated bridge, traversing train tracks, road curvature, road inclination), as well as vehicle performance data such as the actual speed of vehicle 10.

Controller 18 next generates a control signal indicative of the at least one characteristic pertinent to the operation of the vehicle control system 16. The control signal is received by the control unit 28 which employs a control strategy appropriate to the control signal to enhance the performance of the vehicle control system 16. Enhancement of the vehicle control system 16 results from the identification of criteria that effect the performance of the systems that comprise the vehicle control system 16 and the corresponding modification of operational limits that trigger corrective action from these systems. For example, the operational limits may relate to the amount of wheel slip when the vehicle 10 is accelerating or decelerating, the amount of torque output from the engine and transmission assembly 12 or the amount by which the vehicle 10 is being oversteered.

To minimize the size of the database portion 44, controller 18 may also utilize a default setting. The default setting may set the at least one characteristic pertinent to the operation of the vehicle control system 16 in a predetermined manner (e.g., by selecting a road surface type such as "unimproved"). Alternatively, the default setting may permit the vehicle control system 16 to operate in an iterative manner to optimize its performance. The default mode may also be used if the position signal 42 is not available.

Where the control signal includes detailed information as to the portion of the road 46 that vehicle 10 is operating on, as well as vehicular data such as the speed of vehicle 10, the performance of the vehicle control system 16 may be enhanced in a very cost-effective manner. For example, if the vehicle 10 is suddenly driven off the road 46 (e.g., onto the shoulder of the road 46), the control signal can be used to alert the vehicle control system 16 of this condition, permitting rapid actuation of stability system 26 to prevent the vehicle operator from oversteering or understeering to reposition the vehicle 10 on the road 46.

Another example pertains to the ability of the vehicle control system 16 to recognize a bank curve, especially if the surface of the road 46 is not smooth or if the vehicle operator is steering the vehicle 10 in a "choppy" manner around the curve (i.e., in a series of straight lines rather than a continuous curve). In situations such as these, the vehicle 10 would experience vehicle roll in excess of that which would otherwise be associated with the bank curve. In extreme situations, the vehicle 10 may be destabilized when the vehicle control system 16 to reacts to the excess vehicle roll. Receipt of a control signal having a component indicative of the degree to which a curve is banked permits the vehicle control system 16 to factor out the excess component of the vehicle roll, thereby avoiding the adverse effects that can be created by the excess vehicle roll in such situations.

Another example relates to compromises in the performance of vehicle control system 16 that result from the conventional method of indirectly monitoring the speed of vehicle 10 through numerous sensors and a series of complex calculations. During certain maneuvers, the vehicle speed may be calculated incorrectly by these conventional methods, resulting in the impairment of vehicle control and performance. One such example where this may occur relates to the operation of a four-wheel drive vehicle on a road having an icy or snowy surface. Each of the four vehicle wheels 14 can flare (i.e., spin without effectively transmitting a tractive force), causing the vehicle control system 16 to calculate a higher vehicle speed than the actual vehicle speed. In such situations, the performance of the vehicle control system 16 is impaired because the permitted wheel slip is based on the calculated vehicle speed. Receipt of a control signal having a component indicative of the actual speed of vehicle 10 advantageously overcomes this problem, permitting the vehicle control system 16 to activate anti-lock braking system 20 at its maximum vehicle braking performance.

Similar problems can also occur where an aftermarket wheel/tire combination or axle configuration is incorporated into the vehicle 10. Production vehicles are fitted with wheel, tire and axle combinations that are considered mathematically in a series of complex calculations to calculate the speed of the vehicle 10. Changes in the diameter of the tire or gear ratio of the axle will negatively effect the accuracy with which these calculations calculate the speed of the vehicle 10, thereby impairing the performance of the vehicle control system 16.

If, for example, the calculated vehicle speed is higher than the actual speed of the vehicle 10, vehicle instability may result, as it is likely that the traction control system 24 will not provide enough engine interventions to improve the traction of vehicle 10. This situation will also impair the performance of anti-lock braking system 20, as it will tend to over-estimate wheel slip, causing the anti-lock braking system 20 to relieve pressure on the brake caliper 22 sooner and more frequently, resulting in a longer stopping distance.

If, on the other hand, the calculated vehicle speed is lower than the actual speed of the vehicle 10, the drivability of the vehicle 10 may be affected as a result of the traction control system 24 providing engine interventions on a too frequent basis. This situation will also impair the performance of the anti-lock braking system 20, as it will tend to under-estimate wheel slip, causing the anti-lock braking system 20 to relieve pressure on the brake caliper 22 less frequently than is desirable, increasing the risk that the vehicle 10 will skid as it is being stopped.

Receipt by the vehicle control system 16 of a control signal having a component indicative of the actual speed of the vehicle 10 advantageously overcomes these problems, permitting the vehicle control system 16 to use the actual speed of the vehicle to activate the anti-lock braking system 20 or the traction control system 24. Also advantageously, receipt by the vehicle control system 16 of a control signal having a component indicative of the actual speed of the vehicle 10 permits controller 18 to generate a signal to warn the vehicle operator of situations wherein the calculated vehicle speed does not correlate with the actual speed of the vehicle 10.

Where the road surface type 48 is also indicated in the control signal, the vehicle control system 16 is able to evaluate characteristics of the road 46 which may either help or hinder the operation of the vehicle 10. For example, the vehicle control system 16 is able to take advantage of a "plow effect" when the vehicle 10 is operated on a road 46 having a road surface type 48 that is gravel or snowy and the vehicle 10 is being stopped in a straight line. The "plow effect" refers to the wedge-shaped material that collects in front of the vehicle wheels 14 when the vehicle 10 is operated on a road 46 with a soft surface (e.g., sand, snow, mud); this wedge-shaped material tends to resist the forward movement of the vehicle wheels 14. When this condition is known to the vehicle control system 16, the anti-lock brake system 20 can be activated with a deeper slip cycle to take advantage of the "plow effect" and stop the vehicle 10 more rapidly.

As another example, where the control signal includes data on the grade or angle of the road 46, the vehicle control system 16 can activate the anti-lock braking system 20 to employ a deeper slip cycle when vehicle 10 is descending a hill to improve stability and braking performance (e.g., improve stopping distance). Where vehicle 10 is ascending a hill, the vehicle control system 16 can activate the traction control system 24 to allow more wheel slip and fewer engine interventions so as to maximize the hill-climbing capability of vehicle 10.

A further example relates to the ability of the vehicle control system 16 to undertake a proactive role in the operation of the vehicle 10. Where the control signal provides detailed information on the road 46, the vehicle control system 16 is able to evaluate the performance of the vehicle 10 at its present rate of speed to determine if the vehicle will perform properly. If the vehicle control system 16 determines that the vehicle 10 will not perform properly at its present rate of speed, the vehicle control system 16 may be programmed to alert the vehicle operator to the situation and/or to alter the vehicle speed.

Yet another example concerns a function known as "hill decent control". This function is conventionally employed by the vehicle operator when descending a hill to limit the speed of the vehicle to a predetermined speed, such as 9 to 12 k.p.h. In conventional systems, the operator must manually depress a switch to engage the hill decent control function. The vehicle control system 16 can, however, engage a hill decent control function where the control signal includes data on the grade or angle of the road 46. Preferably, additional criteria are also employed prior to engaging this function. The additional criteria may include, for example, a determination that the vehicle brake has been engaged by the vehicle operator, a determination that the vehicle operator is not depressing the vehicle accelerator pedal and/or identification of the road surface type 48.

Figure 4:
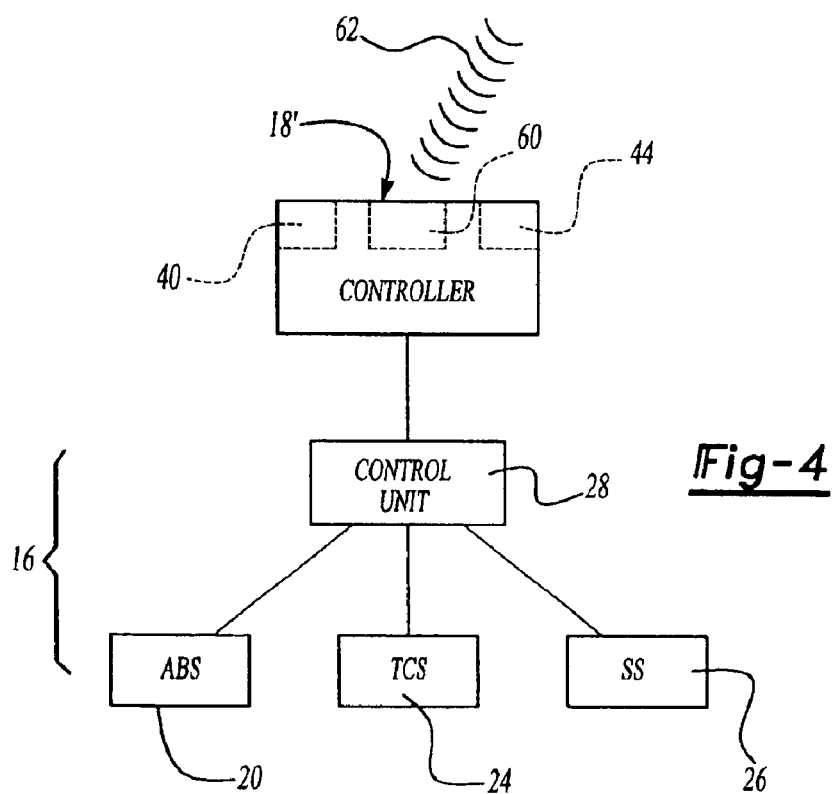
FIG. 4 is a schematic illustration similar to FIG. 3 but illustrating a controller constructed in accordance with an alternate embodiment of the present invention.

A second embodiment of the present invention is schematically illustrated in FIG. 4. The controller 18' is similar to controller 18 but includes a second receiver portion 60. The second receiver portion 60 is operable for receiving a weather signal 62 indicative of the weather in the area proximate the present physical location of vehicle 10. Preferably, the weather signal 62 is manually input from the vehicle operator but may also be automatically input via a plurality of sensors coupled to vehicle 10 or from a regionally broadcast signal transmitted via radio waves. Controller 18' receives the weather signal 62 and determines whether the road surface condition will effect the performance of the vehicle control system 16. If the road surface condition will effect the performance of the vehicle control system 16, the controller 18' generates a control signal that is also indicative of the mad surface condition. As discussed above, the control signal is received by the control unit 28 which employs a control strategy appropriate to the control signal to enhance the performance of the vehicle control system 16.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A vehicle control system for controlling a performance characteristic of the vehicle comprising:

a controller coupled to the vehicle control system, the controller adapted to receive a vehicle position signal, the controller employing the position signal to determine at least one characteristic pertinent to the operation of the vehicle control system and outputting a control signal, and further adapted to receive a weather signal;

wherein said weather signal affects said determination of said characteristic, said weather signal received through broadcast radio transmission;

wherein the vehicle control system receives the control signal and tailors its performance in response thereto; and wherein the controller is operable in a default mode wherein the controller outputs a predetermined default control signal.

2. The vehicle control system of claim 1, wherein the vehicle control system includes an anti-lock brake system and said characteristic includes wheel skidding.

3. The vehicle control system of claim 1, wherein the vehicle control system includes a traction control system and said characteristic includes wheel torque.

4. The vehicle control system of claim 1, wherein the vehicle control system includes a stability system and said characteristic includes a rate at which the vehicle is being steered.

5. The vehicle of claim 1, wherein the control signal includes a road surface type.

6. The vehicle control system of claim 1, wherein the control signal includes a road surface condition.

7. The vehicle control system of claim 1, wherein the control signal includes a vehicle speed signal.

8. The vehicle control system of claim 1, wherein the controller is operable in a second default mode wherein the controller does not output a control signal and permits the vehicle control system to operate in an iterative manner.

9. The vehicle control system of claim 1, wherein said vehicle position signal is received from one or more global positioning satellites.

10. A vehicle control system of claim 1, wherein said controller further adapted to receive a weather signal, and wherein said weather signed affects said determination of said characteristic.

11. A vehicle control system for controlling a vehicle comprising:

an anti-lock brake system for controlling a brake force exerted by a brake caliper to limit vehicle skidding in a predetermined manner;

a traction control system for controlling acceleration of the vehicle to limit wheel slip in a predetermined manner;

a stability system for controlling a yaw rate of the vehicle in a predetermined manner;

a database of various roads, including data on road surface type;

a controller coupled to the anti-lock brake system, the traction control system and the stability system, the controller adapted to receive a vehicle position signal and a weather signal indicative of a proximate weather condition, and to produce a control signal in response thereto, the controller operable in a default mode wherein the controller outputs a predetermined default control signal, the controller determining the road surface type associated with the vehicle position and further determining a road surface condition based on the road surface type and the proximate weather conditions the control signal indicative of the road surface type and the road surface condition; and;

wherein the anti-lock brake system, the traction control system and the stability system receive the control signal and tailor their performance n response thereto.

12. The vehicle control system of claim 11, wherein said vehicle position signal is received from one or more global positioning satellites.

13. A method for controlling a vehicle having a vehicle control system, the method comprising the steps of:

providing a controller for receiving a vehicle position signal;

providing a database of various roads, including data on road surface type;

determining the road surface type corresponding to the vehicle position signal;

inputting a weather signal indicative of a proximate weather condition;

determining a road surface condition based on the road surface type and the proximate weather condition;

generating a control signal based the road surface condition, including determining a if a predetermined condition exists, generating the control signal if the predetermined condition does not exist, and otherwise operation in a default mode; and enhancing the performance of the vehicle control system based on the control signal.

14. The method of claim 13, further comprising the stop of determining an actual speed of the vehicle.

15. The method of claim 13, wherein the step of generating the control signal includes the steps of:

determining if a predetermined condition exists;

generating the control signal if the predetermined condition does not exist; and otherwise, operating in a default mode.

16. The vehicle control system of claim 1 wherein said weather signal is manually inputted by a vehicle operator.

17. The vehicle control system of claim 11 wherein the weather signal includes information from a plurality of sensors coupled to the vehicle.

18. The method of claim 13 wherein the step of inputting a weather signal includes manually inputting information indicative of the weather.

19. The method of claim 13 wherein the step of inputting a weather signal includes receiving a broadcast radio transmission indicative of proximate weather conditions.

20. The method of claim 13 wherein the step of inputting a weather signal includes the step of receiving information from a plurality of sensors coupled to the vehicle.

21. A vehicle control system of claim 11, wherein the default control signal includes a default road surface type.

* * * * *

UNITED STATES PATENT AND TRADEMARK OFFICE
CERTIFICATE OF CORRECTION

PATENT NO. : 6,873,898 B1
DATED : March 29, 2005
INVENTOR(S) : Robert D. Kostadina It is certified that error appears in the above-identified patent and that said Letters Patent is hereby corrected as shown below:

Column 7,
Lines 51-52, delete "conditions" and substitute -- condition -- in its place.

Column 8,
Line 3, after "performance" delete "n" and substitute -- in -- in its place.
Line 23, delete "operation" and substitute -- operating -- in its place.
Line 26, after "comprising the" delete "stop" and substitute -- step -- in its place.

Signed and Sealed this

Sixth Day of September, 2005

JON W. DUDAS
*Director of the United States Patent and Trademark Office*